United States Patent [19]
Koba et al.

[11] Patent Number: 4,719,188
[45] Date of Patent: Jan. 12, 1988

[54] ALUMINA-BASE ABRASION RESISTANT MATERIAL

[75] Inventors: Keiichiro Koba; Akira Matsumoto; Yoshito Morita, all of Tochigi; Tomomi Miyamoto, Fukuoka, all of Japan

[73] Assignee: Mitsui Mining Co., Ltd., Tokyo, Japan

[21] Appl. No.: 894,831

[22] Filed: Aug. 8, 1986

[51] Int. Cl.$^4$ ............................................. C04B 35/10
[52] U.S. Cl. ..................................... 501/133; 501/134; 501/153; 501/154
[58] Field of Search ............... 501/127, 128, 105, 153, 501/133, 134; 51/309

[56] References Cited

U.S. PATENT DOCUMENTS

| | | | |
|---|---|---|---|
| 3,247,000 | 4/1966 | Taylor | 501/105 |
| 3,454,385 | 7/1969 | Amero | 51/309 |
| 4,139,394 | 2/1979 | Esnoult et al. | 501/105 |

FOREIGN PATENT DOCUMENTS

| | | | |
|---|---|---|---|
| 0126008 | 11/1978 | Japan | 501/105 |
| 0130157 | 8/1983 | Japan | 501/105 |
| 0021861 | 2/1985 | Japan | 501/105 |
| 00346281 | 7/1972 | U.S.S.R. | 501/105 |

Primary Examiner—William R. Dixon, Jr.
Assistant Examiner—James M. Hunter, Jr.
Attorney, Agent, or Firm—Oblon, Fisher, Spivak, McClelland, & Maier

[57] ABSTRACT

Disclosed herein is an alumina-base abrasion resistant material obtained by adding, as sintering agents, 0.5–4.0 parts by weight of each of $TiO_2$ and $CuO$ and 0.5–4.0 parts by weight of each of 3 or 4 oxides selected from the group consisting of $Fe_2O_3$, $MnO_2$, $ZrO_2$ and $SiO_2$ to 100 parts of $Al_2O_3$ powder and then sintering the resultant raw batch.

2 Claims, No Drawings

ALUMINA-BASE ABRASION RESISTANT MATERIAL

BACKGROUND OF THE INVENTION (1) Field of the Invention

This invention relates to an alumina-base abrasion resistant material which can be sintered at low temperatures and has high abrasion resistance.

(2) Description of the Prior Art

Abrasion resistant materials composed of $Al_2O_3$ or $Al_2O_3$ and an additive such as $ZrO_2$ have already been developed and used at places subject to severe mechanical abrasion and wearing, for example, at bent portions of chutes and ducts in powder or solid transport lines, impact-bearing parts onto which powder or solids fall down, etc. As production processes of alumina-base materials having still higher strength and abrasion resistance, it has also been known to add either one or 2-3 of MgO, CaO, $Y_2O_3$, $La_2O_3$, $SiO_2$, $Ta_2O_5$ and the like as grain growth inhibitor(s) or sintering agent(s) to $Al_2O_3$ and then sintering the resulting raw batches. These processes however require sintering temperatures as high as 1,470°-1,700° C. and in some instances, need expensive additives such as $Y_2O_3$. They are hence not preferred from the economical stand point. On the other hand, as an exemplary technique for lowering the sintering temperature, it has been reported that the sintering temperature for a dried 96% $Al_2O_3$ body was lowered to 1,300°-1,400° C. by adding a compound additive of $MnO_2$ and $TiO_2$ or CuO and $TiO_2$ to $Al_2O_3$. This process however failed to achieve sufficient abrasion resistance.

As described above, conventionally-known alumina-base abrasion resistance materials required higher sintering temperatures upon their production. In some instances, they also required certain expensive additives. These requirements increased both energy and material costs, resulting in products of higher prices. On the other hand, it was unable to obtain products of any sufficient abrasion resistance in processes which employed additives to lower the sintering temperatures.

SUMMARY OF THE INVENTION

The first object of this invention is to provide an alumina-base abrasion resistant material having high abrasion resistance in spite of its low sintering temperature.

The second object of this invention is to achieve the above object, namely, to provide an alumina-base abrasion resistant material, which is sinterable at low temperatures and has high abrasion resistance, by using relatively inexpensive sintering additives in combination.

The present inventors have carried out an extensive investigation with a view toward attaining the above objects. As a result, the present invention has now been completed.

In one aspect of this invention, there is thus provided an alumina-base abrasion resistant material obtained by adding, as sintering agents, 0.5-4.0 parts by weight of each of $TiO_2$ and CuO and 0.5-4.0 parts by weight of each of 3 or 4 oxides selected from the group consisting of $Fe_2O_3$, $MnO_2$, $ZrO_2$ and $SiO_2$ to 100 parts of $Al_2O_3$ powder and then sintering the resultant raw batch.

Owing to the above-specified types and amounts of sintering agents, the abrasion resistant material of this invention is sinterable at low temperatures, i.e., 1,200°-1,350° C. and has high abrasion resistance in spite of such low sintering temperatures.

DETAILED DESCRIPTION OF THE INVENTION AND PREFERRED EMBODIMENTS

The present invention features the addition of an additive, which is composed of 5 or 6 types of metal oxides, as a sintering agent as described above. Although these components of the additive have been known, either singly or in partial combinations, as sintering agents for $Al_2O_3$, no combinations of sintering agents which combinations are suitable for use with abrasion resistant materials have heretofore been known. The present inventors have conducted screening with respect to numerous combinations of various sintering agents. As a result, it has been found that a combination of $TiO_2$ and CuO as essential components and at least 3 additional oxides selected from the group consisting of $Fe_2O_3$, $MnO_2$, $ZrO_2$ and $SiO_2$ can provide an excellent abrasion resistant material sinterable at low temperatures.

If any one of the components (will hereinafter be called "sintering agents") is added in an amount less than 0.5 part by weight, it is impossible to impart sufficient sinterability or abrasion resistance. However, any amounts greater than 4 parts by weight result in excessive configurational changes upon sintering and hence lead to reduced dimensional accuracy. It is also undesirable from the economical standpoint to incorporate one or more of the sintering agents in such unduly large amounts if they are more expensive than $Al_2O_3$.

In order to improve not only the formability and sinterability of the resulting raw batch and also the abrasion resistance of the resulting product, it is preferable to pulverize the principal raw material, $Al_2O_3$ and the individual sintering agents sufficiently. Their preferable particle sizes may preferably be 2 $\mu$m or smaller, more preferably in the range of 0.8-1.2 $\mu$m, both, in tems of median diameter. It is however economically undesirable to reduce their sizes beyond 0.8 $\mu$m because substantial energy is required for their pulverization, although no deleterious effects are given to the physical properties of the resulting product.

Although $Al_2O_3$ and the individual sintering agents may be separately pulverized and then combined together into an intimate mixture, it is more economical, from the viewpoints of reduced labor for their pulverization and attainment of their intimate mixing, to add the individual sintering agents to $Al_2O_3$ before their pulverization and then to pulverize and mix them at the same time.

The abrasion resistant material of this invention may be produced, for example, in the following manner. The raw material, $Al_2O_3$ is pulverized to 2 $\mu$m or smaller in terms of median diameter by the dry or wet method. As mentioned above, it is preferable to add the individual sintering agents to $Al_2O_3$ before their pulverization and then to pulverize and mix them at the same time. After the thus-ground and pulverized raw batch is granulated or subjected to one or more desired treatments such as an addition of a binder, it is formed into a shape conforming with its end use. Any suitable conventional forming methods such as pressing, extrusion forming and slip casting may be employed depending on each shape to be formed.

In the case of pressing which is the most popular forming method for abrasion resistant materials of relatively simple configurations, the ground and mixed raw batch is once formed into a slurry. It is then granulated by a method known per se in the art, for example, by the shifting method in which the slurry is dried and ground and grains smaller than a suitable grain size are thereafter collected, or by the spray drying method. The resultant grains are then formed into a desired shape under elevated pressure. Alterntively, the raw batch may be added with a binder and/or dispersing agent as needed, followed by formation of a slurry. The slurry is then formed into a green body by extrusion forming, slip casting or the like.

The green body is fired after drying it suitably. If the green body is dried rapidly, there is a danger that the green body may develop crazing and/or cracks due to its surface shrinkage. It is hence essential to conduct its drying under conditions as mild as possible. Although the drying conditions vary depending on the shape and water content of each green body, it is preferable to dry same under such conditions that minimize the difference between the interior water content of the green body and its surface water content. The dried body, which has been thoroughly dried for the removal of volatile components, is then heated in a firing furnace, in which it is maintained at a maximum temperature of 1,200°–1,350° C., preferably, 1,230°–1,280° C. for 1–5 hours so as to complete its sintering. If the temperature is lower than 1,200° C., it cannot be sintered sufficiently. If it is heated to a temperature above 1,350° C. on the other hand, the sintering agents are caused to evaporte so that its sinterability is reduced again and the abrasion resistance of the resulting product is adversely affected. It is therefore undesirable to sinter the dried body at any temperatures outside the above-specified range.

Among the sintering agents employed in the alumina-base abrasion resistant material of this invention, $TiO_2$ and $CuO$ are effective primarily in improving the sinterability of $Al_2O_3$ and lowering its sintering temperature. On the other hand, $MnO_2$, $ZrO_2$, $SiO_2$ and the like serve primarily to inhibit grain growth and hence to improve the abrasion resistance of the resulting sintered body. Namely, they have mutually contradictory properties. No sintering agents capable of imparting high abrasion resistance at low sinteing temperatures have been known to date. The additive useful in the practice of this invention is a compound additive which has been found as a result of an investigation on various combinations of 5–6 sintering agents. Use of this additive has made it possible for the first time to obtain an alumina-base abrasion resistant material having extremely high abrasion resistant inspite of its sintering at temperatures as low as 1,2000°–1,350° C.

The present invention will hereinafter be described specifically by the following Examples, in which each abrasion resistance tests was conducted in the following manner.

A siliceous sand blasting nozzle (inner diameter: 4 mm) was set upright with the nozzle pointing downwards. On the other hand, a test piece (a plate-like specimen of 80 mm×50 mm wide and 10 mm thick) of an abrasion resistant material was positioned at a point 20 mm apart from the nozzle and at an angle of 45° relative to the direction of the nozzle. Siliceous sand was blasted against the test piece with compression air of 6.4–8.5 $kg/cm^2$ (G) through the nozzle. By the difference between the weight of the test piece before the sand blasting and that after the sand blasting, its abrasion resistance was evaluated. Incidentally, the grain size distribution of the siliceous sand employed was as follow in terms of cummulative % coarser.

| Mesh | 20 | 28 | 35 | 48 | 65 | 100 |
|---|---|---|---|---|---|---|
| Cumulative (wt. %) % coarser | 0.2 | 17.4 | 67.7 | 94.1 | 99.5 | 99.9 |

EXAMPLES 1–12 & COMPARATIVE EXAMPLES 1–4

Additives shown in Table 1 were added in their corresponding amounts prescribed in the same table to a raw material, $Al_2O_3$. The resulting mixtures were respectively pulverized by the dry method in an "Attritor" (trade mark; manufactured by Mitsui Miike Engineering Corporation) to particle sizes of 1.0 μm and smaller in terms of median diameter. After granulating them by the shifting method, they were formed under 300 kg/cm2 into plate-like green bodies. Those green bodies were dried and then fired in accordance with the following firing pattern in a shuttle kiln.

| Temperature ranges: | |
|---|---|
| Room temperature - 1,100° C.: | Raised at 100° C./hr. |
| 1,100° C. - the respective firing temperatures given in Table 1: | Raised at 40–50° C./hr. |
| Respective firing temperatures: | Maintained for 1.5–2.0 hrs. |
| Respective firing temperature to room temperature: | Left over for natural cooling |

In Table 1, there are shown various conditions employed for the production of the abrasion resistant materials in the Examples as well as results of a test in which test pieces were prepared respectively from the abrasion resistant materials and their abrasion resistance were investigated by the above-described testing method. The densities of the abrasion resistant materials, namely, the sintered bodies are also given in Table 1.

TABLE 1

| Example of Comp. Ex. No. | Added amounts of sintering agents (parts by weight based on 100 parts by weight of $Al_2O_3$) | | | | | | Sintering temperature (°C.) | Degree of abrasion (mg) | Density of sintered body (g/cm$^3$) |
|---|---|---|---|---|---|---|---|---|---|
| | $TiO_2$ | $CuO$ | $Fe_2O_3$ | $MnO_2$ | $ZrO_2$ | $SiO_2$ | | | |
| Example 1 | 1.0 | 1.0 | 1.0 | 1.0 | 1.5 | 2.5 | 1230 | 15 | 3.60 |
| Example 2 | 1.0 | 1.0 | 1.0 | 1.0 | 1.5 | 2.5 | 1280 | 4 | 3.85 |
| Example 3 | 1.0 | 1.0 | 1.0 | 1.0 | 1.0 | 1.0 | 1230 | 4 | 3.93 |
| Example 4 | 1.7 | 1.7 | 1.7 | 1.7 | 2.6 | 2.6 | 1230 | 21 | 3.60 |
| Example 5 | 1.0 | 1.0 | 0 | 1.0 | 1.0 | 3.0 | 1230 | 35 | 3.50 |
| Example 6 | 1.7 | 1.7 | 0 | 1.7 | 1.7 | 3.0 | 1230 | 23 | 3.57 |
| Example 7 | 1.0 | 1.0 | 1.0 | 0 | 1.0 | 3.0 | 1230 | 32 | 3.47 |
| Example 8 | 1.7 | 1.7 | 1.7 | 0 | 1.7 | 3.0 | 1230 | 21 | 3.60 |
| Example 9 | 1.0 | 1.0 | 1.0 | 1.0 | 0 | 3.0 | 1230 | 19 | 3.59 |

TABLE 1-continued

| Example of Comp. Ex. No. | Added amounts of sintering agents (parts by weight based on 100 parts by weight of Al$_2$O$_3$) | | | | | | Sintering temperature (°C.) | Degree of abrasion (mg) | Density of sintered body (g/cm$^3$) |
|---|---|---|---|---|---|---|---|---|---|
| | TiO$_2$ | CuO | Fe$_2$O$_3$ | MnO$_2$ | ZrO$_2$ | SiO$_2$ | | | |
| Example 10 | 1.7 | 1.7 | 1.7 | 1.7 | 0 | 3.0 | 1230 | 22 | 3.61 |
| Example 11 | 1.0 | 1.0 | 1.0 | 1.0 | 1.0 | 0 | 1230 | 59 | 3.60 |
| Example 12 | 1.7 | 1.7 | 1.7 | 1.7 | 1.7 | 0 | 1230 | 42 | 3.77 |
| Comp. Ex. 1 | 0 | 1.0 | 1.0 | 1.0 | 1.0 | 3.0 | 1230 | 253 | 2.92 |
| Comp. Ex. 2 | 0 | 1.7 | 1.7 | 1.7 | 1.7 | 3.0 | 1230 | 77 | 3.32 |
| Comp. Ex. 3 | 1.0 | 0 | 1.0 | 1.0 | 1.0 | 1.0 | 1230 | 220 | 2.96 |
| Comp. Ex. 4 | 1.7 | 0 | 1.7 | 1.7 | 1.7 | 1.7 | 1230 | 88 | 3.32 |

It is understood that the six types of sintering agents were all added and extremely good abrasion resistance were attained in Examples 1–4. In Examples 5–12, the additives had such compositions that the four sintering agents other than TiO$_2$ and CuO were excluded one in each Example. All of the sintered bodies exhibited superb abrasion resistance in these Examples. On the other hand, it is also envisaged that the abrasion resistance was reduced significantly in Comparative Examples 1–4 in which either TiO$_2$ or CuO was excluded among the sintering agents.

It is also understood from the densities of the sintered bodies that the products of the Examples, which relate to the present invention, were fully sintered although they were sintered at the low temperatures.

EXAMPLE 13

Sintering agents were mixed in the same proportions as those employed in Example 9 with a raw material, alumina (purity: 99.4%). The resulting mixture was pulverized by the wet method in the "Attritor" to a particle size of 0.85 μm in terms of median diameter. The raw batch was thereafter processed in the same manner as in Examples 1–12 to obtain an abrasion resistant material. Its abrasion was 5 mg whereas its density was 3.85 g/cm$^3$. It had extremely good abrasion resistance.

COMPARATIVE EXAMPLES 5–25

Following the procedures of Examples 1–12, abrasion resistant materials were separately produced by using various sintering agents either singly or in combinations of two. The proportions of the sintering agents and the sintering temperatures are shown along with their corresponding test results under Comparative Examples 5–25 in Table 2.

When sintered at 1,230° C., the advantageous effects brought about by the addition of TiO$_2$ and CuO addition are observed compared with the degree of abrasion of Al$_2$O$_3$ sintered without using any sintering agents. It was however impossible to achieve sufficient abrasion resistance. The abrasion resistance was either equal to or on the contrary, lowered by the other sintering agents compared with the abrasion resistant material obtained without any sintering agents. No additional effects were observed even when their proportions were increased. Although the abrasion resistance was improved when the sintering temperature was raised to 1,300° C., the value was still hardly acceptable.

COMPARATIVE EXAMPLES 26–30

Following the procedures of Examples 1–12, abrasion resistant materials were produced by using the sintering agents in larger amounts. The proportions of the sintering agents and the sintering temperatures are given along with their corresponding test results in Table 2. As shown in Table 2, the degrees of abrasion of the abrasion resistant materials are not substantially different from those of the abrasion resistant materials obtained by using the sintering agents within the range specified in the present invention. Hence, it is also unnecessary from the economical viewpoint to increase the proportions of the sintering agents beyond the upper limit specified in the present invention.

TABLE 2

| Comp. Ex. No. | Added amounts of sintering agents (parts by weight based on 100 parts by weight of Al$_2$O$_3$) | | | | | | Sintering temperature (°C.) | Degree of abrasion (mg) | Density of sintered body (g/cm$^3$) |
|---|---|---|---|---|---|---|---|---|---|
| | TiO$_2$ | CuO | Fe$_2$O$_3$ | MnO$_2$ | ZrO$_2$ | SiO$_2$ | | | |
| Comp. Ex. 5 | 0 | 0 | 0 | 0 | 0 | 0 | 1230 | 1859 | 2.40 |
| Comp. Ex. 6 | 0 | 0 | 1.0 | 0 | 0 | 0 | 1230 | 1898 | 2.40 |
| Comp. Ex. 7 | 0 | 0 | 1.7 | 0 | 0 | 0 | 1230 | 2212 | 2.37 |
| Comp. Ex. 8 | 0 | 0 | 0 | 1.0 | 0 | 0 | 1230 | 1515 | 2.45 |
| Comp. Ex. 9 | 0 | 0 | 0 | 1.7 | 0 | 0 | 1230 | 1525 | 2.56 |
| Comp. Ex. 10 | 0 | 0 | 0 | 0 | 1.0 | 0 | 1230 | 3010 | 2.22 |
| Comp. Ex. 11 | 0 | 0 | 0 | 0 | 1.7 | 0 | 1230 | 2172 | 2.32 |
| Comp. Ex. 12 | 0 | 0 | 0 | 0 | 2.6 | 0 | 1230 | 2423 | 2.28 |
| Comp. Ex. 13 | 1.0 | 0 | 0 | 0 | 0 | 0 | 1230 | 549 | 3.37 |
| Comp. Ex. 14 | 1.7 | 0 | 0 | 0 | 0 | 0 | 1230 | 601 | 3.21 |
| Comp. Ex. 15 | 0 | 0 | 0 | 0 | 0 | 3.0 | 1230 | 2380 | 2.28 |
| Comp. Ex. 16 | 0 | 1.0 | 0 | 0 | 0 | 0 | 1230 | 857 | 2.79 |
| Comp. Ex. 17 | 0 | 1.7 | 0 | 0 | 0 | 0 | 1230 | 952 | 2.81 |
| Comp. Ex. 18 | 0 | 0 | 0 | 0 | 0 | 0 | 1300 | 607 | 2.95 |
| Comp. Ex. 19 | 0 | 0 | 1.0 | 0 | 0 | 0 | 1300 | 377 | 2.94 |
| Comp. Ex. 20 | 0 | 0 | 0 | 1.0 | 0 | 0 | 1300 | 146 | 3.23 |
| Comp. Ex. 21 | 0 | 0 | 0 | 0 | 1.0 | 0 | 1300 | 535 | 2.90 |
| Comp. Ex. 22 | 1.0 | 0 | 0 | 0 | 0 | 0 | 1300 | 207 | 3.51 |
| Comp. Ex. 23 | 0 | 1.0 | 0 | 0 | 0 | 0 | 1300 | 307 | 3.29 |
| Comp. Ex. 24 | 0.5 | 0.5 | 0 | 0 | 0 | 0 | 1300 | 206 | 3.71 |
| Comp. Ex. 25 | 0.5 | 0 | 0 | 0.5 | 0 | 0 | 1300 | 158 | 3.74 |
| Comp. Ex. 26 | 5.0 | 5.0 | 5.0 | 5.0 | 0 | 5.0 | 1230 | 38 | 3.52 |
| Comp. Ex. 27 | 5.0 | 5.0 | 0 | 5.0 | 0 | 5.0 | 1230 | 25 | 3.48 |
| Comp. Ex. 28 | 5.0 | 5.0 | 5.0 | 5.0 | 5.0 | 5.0 | 1230 | 36 | 3.52 |

TABLE 2-continued

| Comp. Ex. No. | Added amounts of sintering agents (parts by weight based on 100 parts by weight of $Al_2O_3$) | | | | | | Sintering temperature (°C.) | Degree of abrasion (mg) | Density of sintered body (g/cm$^3$) |
| --- | --- | --- | --- | --- | --- | --- | --- | --- | --- |
| | $TiO_2$ | CuO | $Fe_2O_3$ | $MnO_2$ | $ZrO_2$ | $SiO_2$ | | | |
| Comp. Ex. 29 | 5.0 | 5.0 | 5.0 | 0 | 0 | 5.0 | 1230 | 29 | 3.58 |
| Comp. Ex. 30 | 5.0 | 5.0 | 5.0 | 5.0 | 0 | 0 | 1230 | 97 | 3.75 |

We claim:
1. An alumina-base abrasion resistant material comprising a sintered product of 100 parts by weight of $Al_2O_3$ powder and an admixure of sintering agents consisting essentially of 0.5–4.0 parts by weight of each of $TiO_2$ a CuO, of $Fe_2O_3$, $MnO_2$ and $SiO_2$, said sintering being conducted at 1,200°–1,350° C.

2. A method of preparing an alumina-base abrasion resistant material sinterable at 1,200°–1,350° C. which comprises adding to 100 parts by weight of $Al_2O_3$ powder as sintering agents an admixture consisting essentially of 0.5–4.0 parts by weight of each of $TiO_2$ a CuO, $Fe_2O_3$, $MnO_2$ and $SiO_2$, and optionally a binder, forming into a shape conforming with its end use by a suitable conventional forming method, and sintering the resultant raw batch at 1,200°–1,350° C.

* * * * *

UNITED STATES PATENT AND TRADEMARK OFFICE
CERTIFICATE OF CORRECTION

PATENT NO. : 4,719,188
DATED : January 12, 1988
INVENTOR(S) : KEIICHIRO KOBA ET AL It is certified that error appears in the above-identified patent and that said Letters Patent is hereby corrected as shown below:

In col. 7, line 14, "a" should be --,--;

"of" should be cancelled.

In col. 8, line 12, "a" should be --,--.

Signed and Sealed this

Sixteenth Day of August, 1988

Attest:

DONALD J. QUIGG

Attesting Officer

Commissioner of Patents and Trademarks